W. W. PRICE.
APPARATUS FOR FORMING FLANGED ANNULAR BANDS OR SLEEVES.
APPLICATION FILED FEB. 23, 1911.

1,210,531. Patented Jan. 2, 1917.
8 SHEETS—SHEET 1.

Fig. 1.

Witnesses
G. Howard Walmsley
Harriet L. Hammaker

Inventor
William W. Price,
By H. B. Toulmin
Attorney

W. W. PRICE.
APPARATUS FOR FORMING FLANGED ANNULAR BANDS OR SLEEVES.
APPLICATION FILED FEB. 23, 1911.

1,210,531.

Patented Jan. 2, 1917.
8 SHEETS—SHEET 2.

W. W. PRICE.
APPARATUS FOR FORMING FLANGED ANNULAR BANDS OR SLEEVES.
APPLICATION FILED FEB. 23, 1911.

1,210,531.

Patented Jan. 2, 1917.
8 SHEETS—SHEET 8.

Witnesses
G. Howard Walmsley
Harriet L. Hammaker

Inventor
William W. Price,
By
Attorney

UNITED STATES PATENT OFFICE.

WILLIAM W. PRICE, OF DAYTON, OHIO.

APPARATUS FOR FORMING FLANGED ANNULAR BANDS OR SLEEVES.

1,210,531.     Specification of Letters Patent.     Patented Jan. 2, 1917.

Application filed February 23, 1911. Serial No. 610,201.

*To all whom it may concern:*

Be it known that I, WILLIAM W. PRICE, a citizen of the United States, residing at Dayton, in the county of Montgomery and State of Ohio, have invented certain new and useful Improvements in Apparatus for Forming Flanged Annular Bands or Sleeves, of which the following is a specification, reference being had therein to the accompanying drawings.

This invention relates to a method of and apparatus for forming flanged annular bands or sleeves, such, for example, as form parts of pipe couplings. These annular bands or sleeves extend over the abutting ends of the pipes to be coupled, have their outer ends flared or flanged to form recesses between the sleeves and the pipe to receive a packing and, if desired, may be provided with an internal centrally arranged annular rib to properly position the sleeve with reference to the end of the pipe. The sleeves are formed from plates of metal, usually from flat stock, which is bent into the form of a sleeve or annular band, the adjacent edges of the plate welded together, the ends flared outwardly or flanged and the annular rib formed therein. Heretofore, the manufacture of such a sleeve required several operations and the process was both slow and expensive.

The object of the present invention is to produce such a sleeve at a single operation.

A further object of the invention is to provide an apparatus which will at one operation bend a plate of metal into the form of a sleeve, weld together the adjacent edges thereof, form flanges at the opposite ends thereof and, when desired, form thereon a central annular rib; and it is also an object of the invention to provide such an apparatus, parts of which can be manipulated to release the completed sleeve and permit it to be removed from the apparatus.

It is a further object of the invention to provide means to remove the "fin," that is, the metal forced outward beyond the ends of the flanges by the action of the rollers.

In the accompanying drawings.

The method of forming a flanged annular band or sleeve from a plate or blank of metal, which is preferably flat, consists in simultaneously bending the plate into the form of a sleeve, turning the edges of the plate outward to form flanges on the end of the sleeve and welding together the adjacent edges of the plate. As a further step in the method the internal annular rib may be formed on the sleeve by the same operation.

In the accompanying drawings I have illustrated one form of apparatus for carrying out this method. This apparatus comprises a mandrel mounted on a shaft which is journaled in suitable bearings formed in bearing brackets supported by a base of concrete or other suitable material. Arranged about the circumference of the mandrel are a series of forming rollers coöperating therewith to bend the plate of metal, form the flanges thereon and weld together the adjacent edges of the plate, the plate having been previously heated to a welding heat. Inasmuch as the completed sleeve has outwardly extending annular flanges it obviously cannot be withdrawn from the mandrel in the ordinary manner and I, therefore, provide means for manipulating certain parts of the apparatus to permit the sleeve to be removed. The character and arrangement of these parts and the manner of their manipulation may, of course, be varied to adapt the same to varying conditions. In the present instance I have shown the mandrel as comprising two parts 1 and 2, the line of division being preferably substantially midway between the ends of the mandrel and in a plane extending transversely to the axis of its rotation. Each part of the mandrel is provided at its outer edge with an annular flange, as indicated at 3 and 4, the shape and arrangement of this flange being such as to form on the sleeve a flange or flare of the desired shape. The mandrel is mounted on a shaft comprising two parts 5 and 6, each of which is rigidly secured at its inner end to the corresponding part of the mandrel. The parts 5 and 6 of the shaft are rotatably and slidably mounted in bearings 7, 7$^a$, 8 and 8$^a$, respectively, which bearings are formed in suitable bearing brackets or frame members supported by a base which may be of concrete or of any suitable character. In order that the shaft may be properly supported each portion of the same is provided with two bearings, as shown. The only connection between the abutting ends of the two parts thereof consists of a shallow recess 5$^a$ in one part of the mandrel and a corresponding projection 6$^a$ on the other part thereof and coöperating with the recess to maintain the two parts of the mandrel in proper alinement. Arranged on opposite sides of the mandrel are housings or frame members 9 and 10 having bearings for the forming rollers. The forming rollers are divided into two groups and each group is carried by a separate support. To this end both housings or supporting frames for the forming rollers are divided into two parts, one of which is permanently mounted on the base and the other of which is movable relatively thereto so that the one group of rollers can be moved toward and away from the other group and also toward and away from the mandrel. The number and arrangement of the forming rollers comprising the two groups may, of course, be varied to accommodate the same to varying conditions, but, as here shown, the group of forming rollers carried by the fixed portion of the housing or supporting frame comprises four rollers 11, while the group of forming rollers carried by the movable portion of the frame or housing comprises three rollers 12. In the present arrangement of the device the rollers 11 constitute the lower group and the rollers 12 the upper group, the housing being divided on approximately a horizontal line. Each roller of both groups is mounted on a shaft 13 journaled in adjustable bearings 14 carried by the housings and each shaft is provided with a gear 15 by means of which the roller is positively actuated.

The adjustable bearings 14 for the forming rollers enables these rollers to be adjusted toward and away from a common center, thereby adapting the same for use with mandrels of different diameters. Any material adjustment of the bearings would, of course, necessitate the substitution of larger or smaller gears 15 for those shown in the present machine but slight adjustments can be made without disengaging the gears 15 from their drivers. The range of adjustment of the bearings is limited and in order to provide a wider adjustment and enable a greater variety of mandrels to be utilized in one machine I prefer to mount the forming rollers upon removable blocks forming a part of the housings, as indicated at 70 and 71. These blocks are readily removable and different blocks have the rollers mounted thereon in different relative positions and at different distances from the common center, this center being the center about which the mandrel rotates. By changing from one supporting block to another the forming rollers are accommodated to mandrels of different diameters. Preferably, there would be a series of interchangeable blocks to accommodate the forming rollers to mandrels of widely different diameters and the adjustability of the bearings for the forming rollers would be retained for the purpose of securing smaller adjustments and accommodating the rollers to mandrels differing but slightly in diameter.

Figure 1:
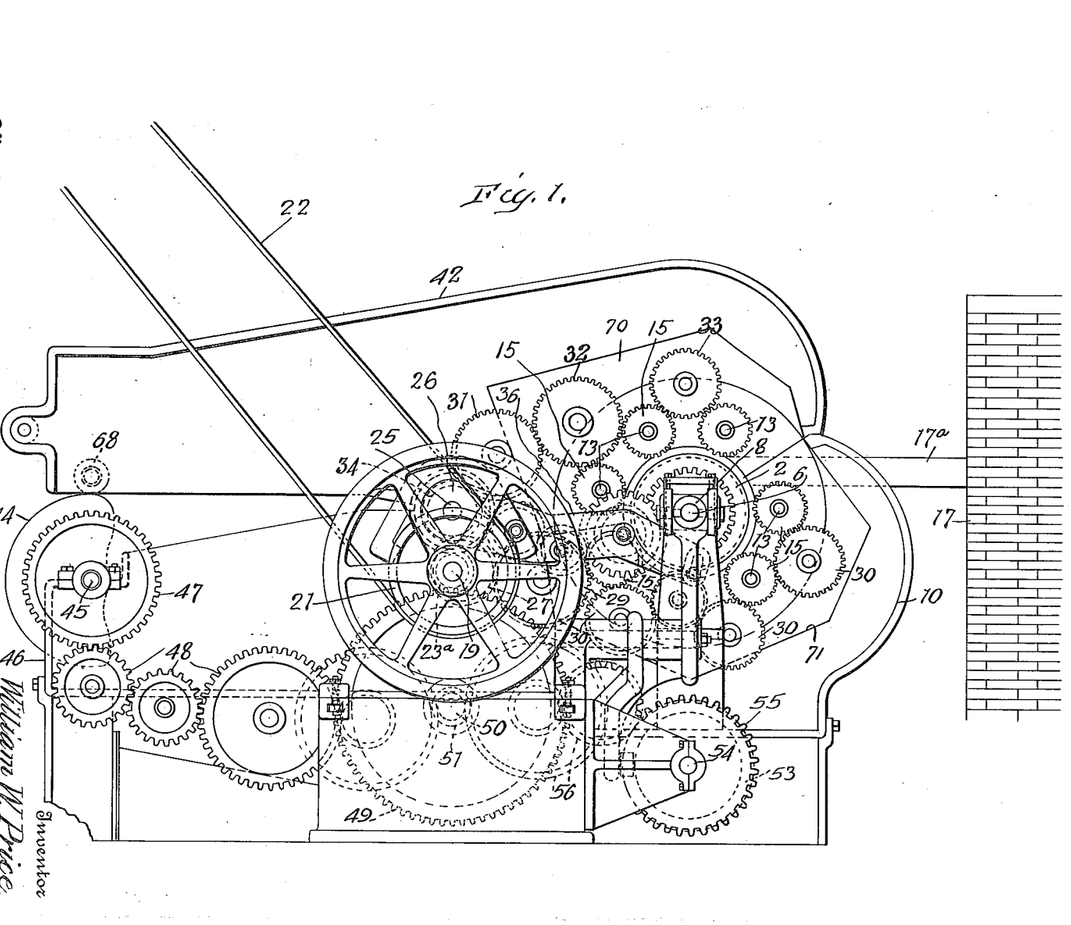
Figure 1 is a side elevation of an apparatus embodying my invention and also including a portion of the furnace for heating the plates.
Figures 2, 6, 15:
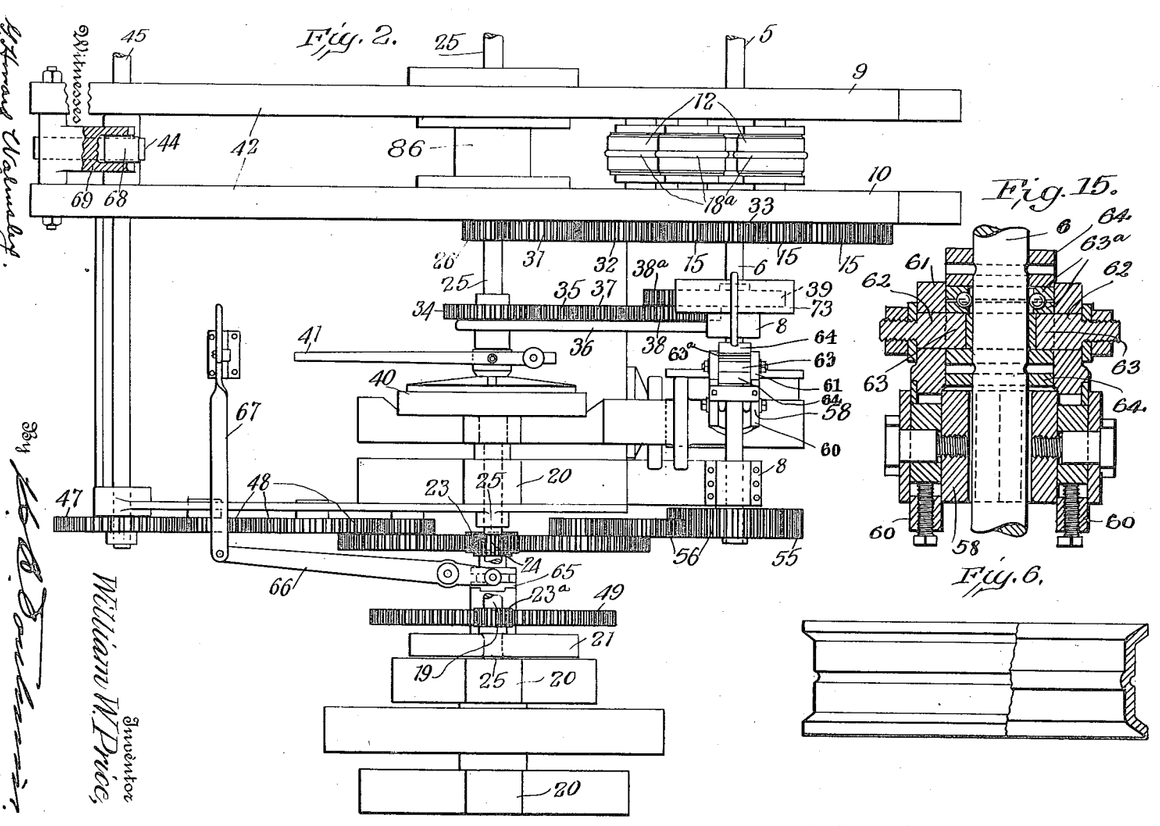
Fig. 2 is a top plan view of such an apparatus.
Fig. 6 is a detail view, partially broken away, of the flanged sleeve.
Fig. 15 is a sectional detail view of the connections between the mandrel actuating arms and the shafts for the mandrel.
Figures 3, 13, 14:
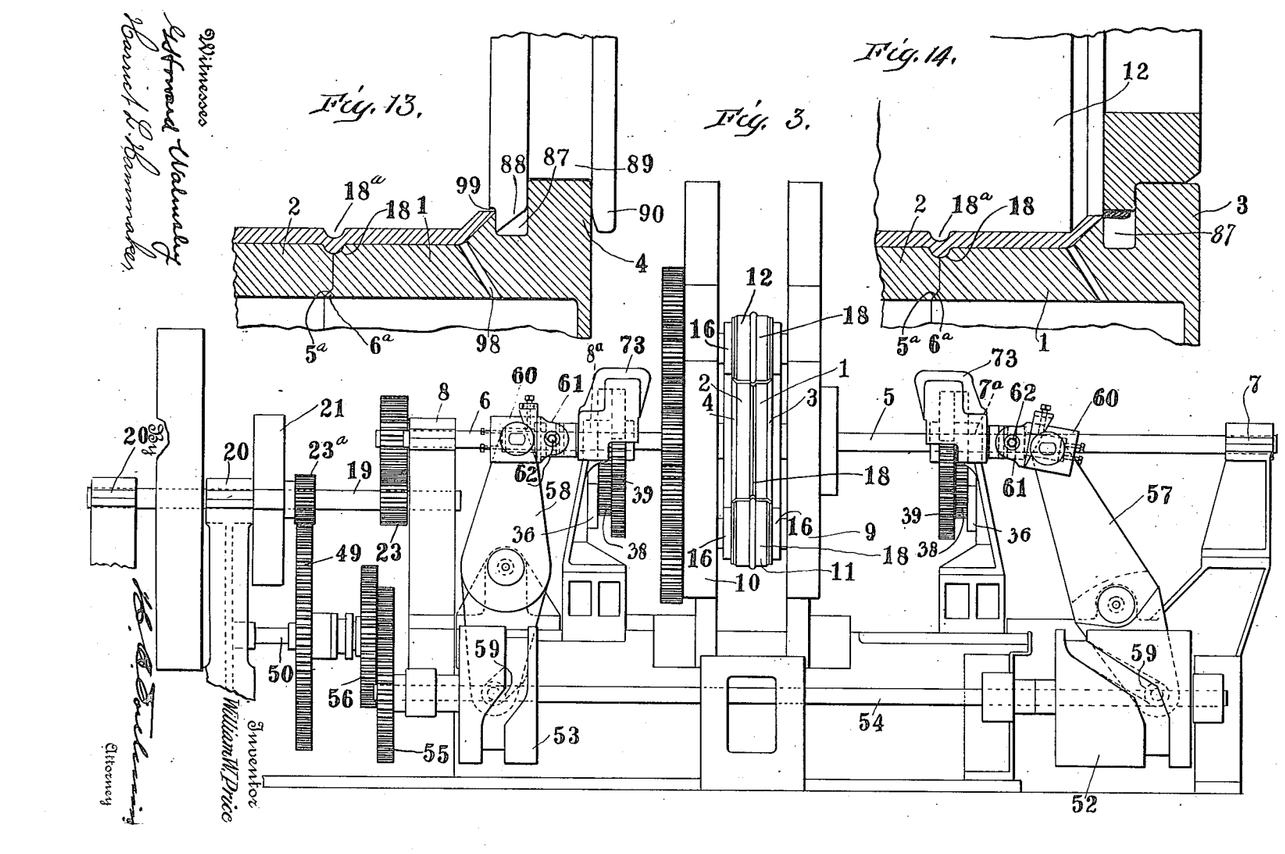
Fig. 3 is an end elevation thereof, partly in section.
Fig. 13 is a fractional detail view showing portions of the mandrel in section and a part of one of the cutters.
Fig. 14 is a similar view, with the addition of one of the forming rollers.
Figure 4:
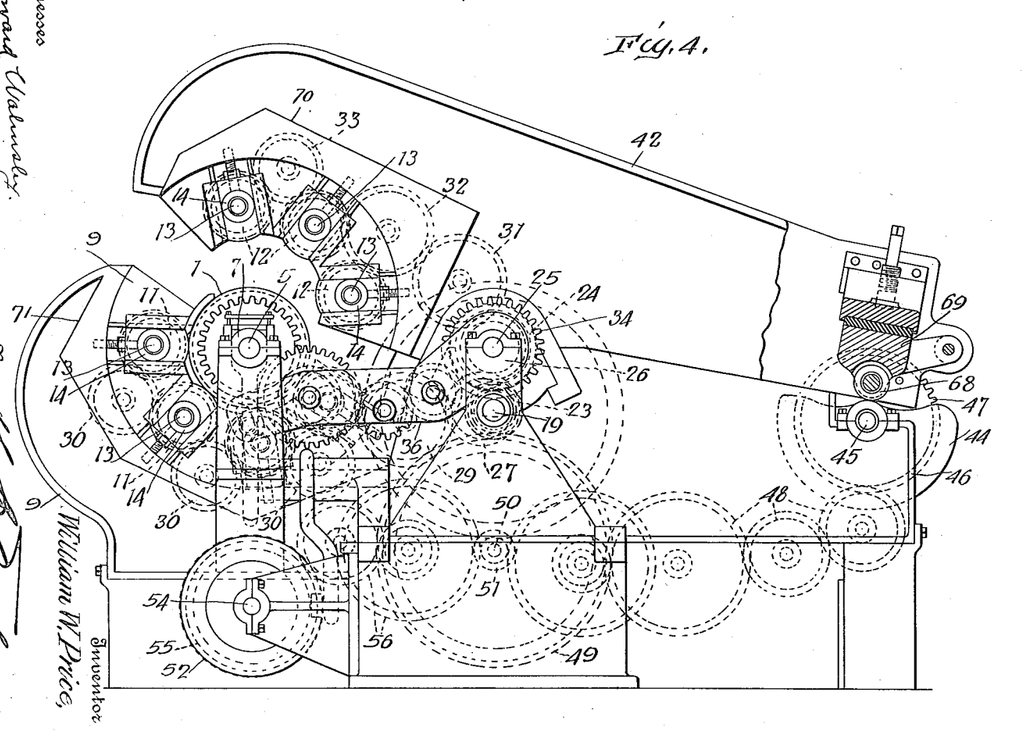
Fig. 4 is an elevation of that side of the machine opposite the side shown in Fig. 1.
Figure 5:
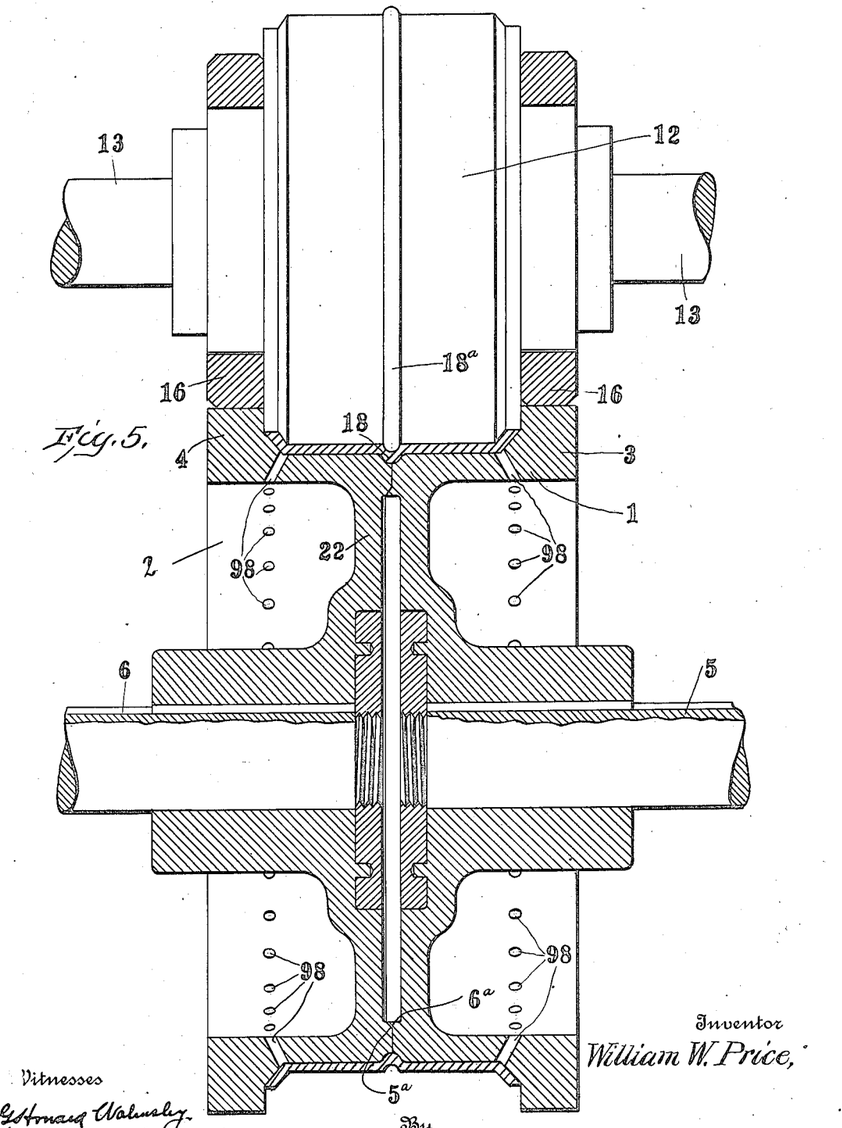
Fig. 5 is a sectional, detail view of the mandrel and one of the forming rollers.

Each forming roller comprises a central body portion shaped to fit between the flanges of the mandrel and having such relation thereto as to coöperate therewith to form the flanges on the plate of metal as it is bent into a sleeve. As has already been explained the two part mandrel comprises a central cylindrical body portion having at its opposite ends outwardly flared portions to form the flanges on the sleeve. Preferably at the ends of these outwardly flared portions the mandrel is provided with straight walls extending at substantially right angles to the axis of the mandrel and forming shoulders. Each forming roller comprises a cylindrical body portion corresponding in length to the length of the cylindrical body portion of the mandrel. At each end of the cylindrical body portion is an outwardly flared portion to coöperate with the outwardly flared portion of the mandrel and forming the flange on the sleeve. Beyond the outwardly flared portions at the respective ends of the forming roller are other cylindrical portions having their surfaces substantially parallel with the surface of the central cylindrical portion of the roller and preferably of such a length that they will fit snugly within the shoulders on the mandrel, thus causing their peripheries to engage the edges of the outwardly flared portions or flanges of the sleeve which is being formed. As a result of this formation of the mandrel and rollers the finished product comprises a sleeve having a central cylindrical body portion provided at each end with an outwardly flared portion or flange, the edges of which flanges are substantially parallel with the cylindrical body portion of the sleeve. A sleeve of this shape has important advantages in the use for which it was designed. The edges of the flanges, which are parallel with the cylindrical body portion of the sleeve will be flush with the surfaces of the clamping rings and the extreme outer ends of the sleeve will be the edges of the flanges which are in engagement with the clamping rings. As a result the only surfaces exposed to the packing rings are the inclined surfaces of the outwardly flared portions or flanges. Consequently, when the pressure is applied to the packing rings they will be forced toward the points of contact between the sleeve and the pipes, thus causing the packing to be pressed tightly against the joint which it is desired to seal. Where the extreme end portions of the sleeve are removed from the surface of the clamping ring these edges will be engaged by the edge of the packing and will take up a larger or smaller portion of the pressure which is exerted upon the packing ring and thus prevent the proper pressure being exerted upon the joint. Inasmuch as the two parts of the mandrel are supported by the ends of the two part shaft, 5—6, at points some distance from the nearest bearings it is desirable that the mandrel should be supported in some manner to prevent the shaft being sprung when the mandrel is subjected to the heavy strains which it receives in the normal operation of the apparatus. For this purpose the reduced portions of the forming rollers, that is, the portions on the opposite sides of the central or body portion which extends between the flanges of the mandrel, are so arranged as to be engaged by the peripheries of the flanges on the mandrel and to hold the mandrel against lateral displacement. To prevent this contact between the flanges of the mandrel and the reduced portions of the forming rollers interfering with the rotation of these parts the reduced portions of the forming rollers are provided with collars 16 loosely mounted thereon and adapted to rotate relatively thereto.

In the operation of the device the mandrel and the forming rollers are positively rotated in the manner hereinafter to be described and the plate of metal, which has been heated to a welding heat in a suitable furnace, a portion of which is here shown at 17, is fed along a guideway or chute 17ª to the mandrel and is moved into engagement with the mandrel and the nearest forming roller. The mandrel and the rollers being positively rotated grip the plate between them, bend the same about the mandrel and turn the edges outward to form the flanges. A deflector 72 prevents the plate shooting off at a tangent between the first two forming rollers, and, after it has passed the second roller, it has assumed a curved shape which causes it to follow the periphery of the mandrel. The length of the plate is such that when it has been bent into annular shape the edges thereof which extend parallel with the axis of rotation of the mandrel will lie adjacent one to the other, preferably overlapping, and the action of the rollers and the mandrel will serve to weld together these edges, thereby forming the sleeve complete at a single operation. It will be understood, of course, that the mandrel makes a number of rotations and that the sleeve is rapidly revolved about the axis of the mandrel and in engagement with the several rollers before the formation and welding is completed. When it is desired to provide the sleeve with an internal annular rib the mandrel is provided with an annular groove, as indicated at 18. In the present instance the line of division between the two parts of the mandrel is central thereof, and, it being desired to form the rib centrally of the sleeve, the outer corners of the adjacent faces of the two parts of the mandrel are cut away or beveled, and, when the two parts of the mandrel are in engagement one with the other, a groove is thus formed centrally of the mandrel. The forming rollers are provided with annular ribs 18ª arranged to force a portion of the metal of the plate or sleeve into the annular groove of the mandrel. It will be obvious, of course, that, if desired, the rib may be formed upon the flat stock before it is delivered to the machine. When the rib stock is used the annular groove in the mandrel is retained to receive the rib but the annular ribs may be omitted from the forming rollers.

Figures 7, 8, 9:
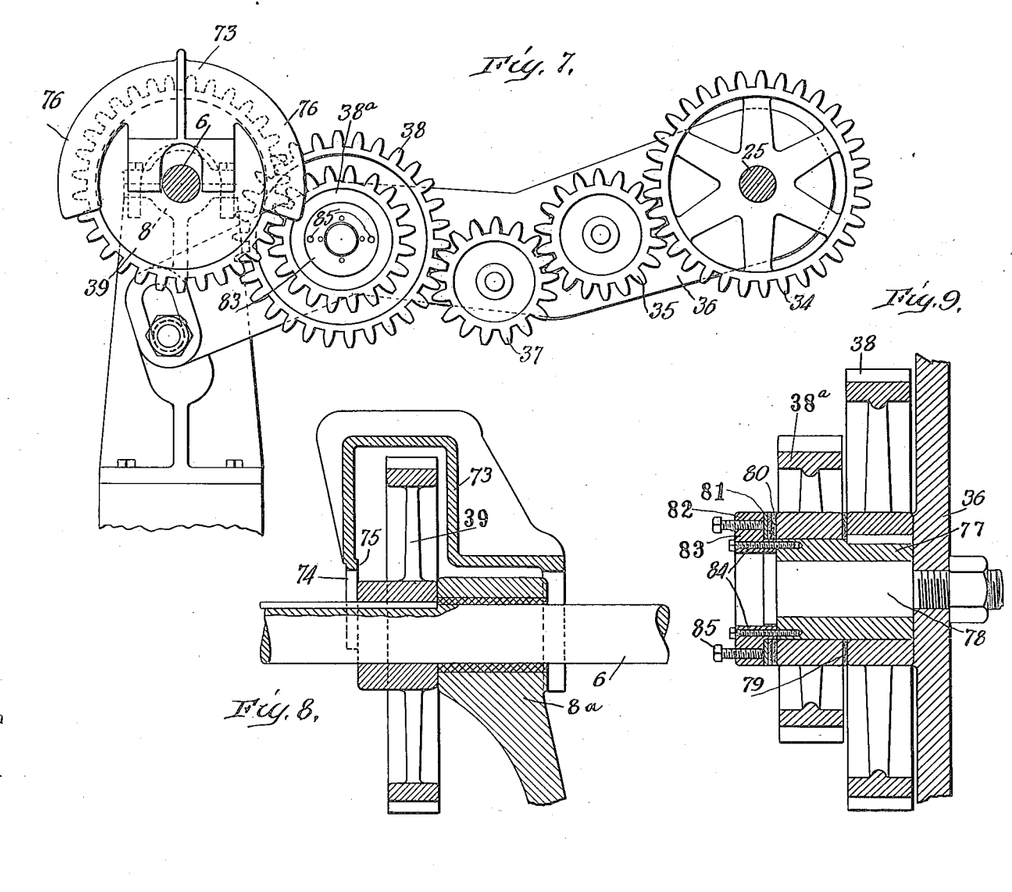
Fig. 7 is a detail view of one of the trains of gearing connecting the countershaft with the mandrel shaft.
Fig. 8 is a sectional, detail view of the guard and retaining device for the gear on the mandrel shaft.
Fig. 9 is a sectional, detail view of the yieldable connection between the mandrel shaft and the driving shaft.
Figure 10:
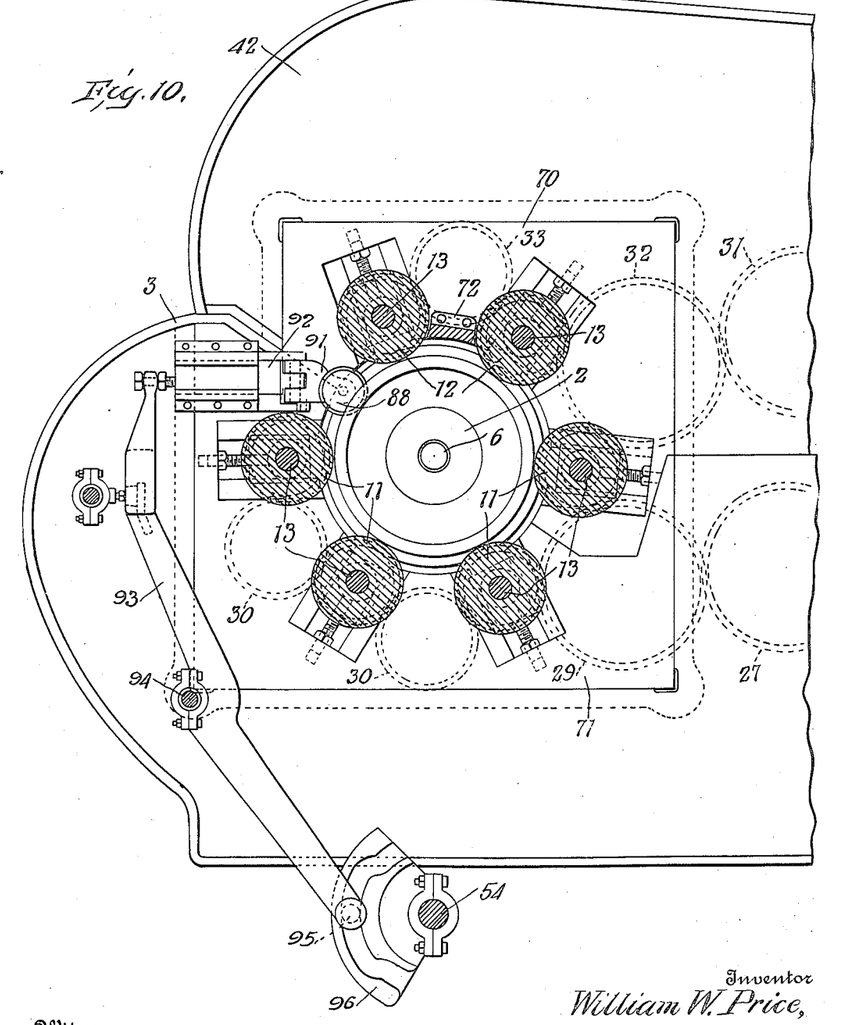
Fig. 10 is a sectional view of a modified form of the device embodying a cutter.

Movement may be imparted to the mandrel and to the forming rollers in any suitable manner. In the present instance I have provided the apparatus with a driving shaft 19 journaled in suitable bearings 20 on the frame members or supporting brackets of the apparatus and provided with a belt wheel 21 which may be driven by means of a belt 22 from any suitable source of power. This driving shaft is preferably connected to the parts to be driven by trains of gearing. The two groups of forming rollers being movable relatively one to the other it is necessary, of course, that they should be separately driven, and, in the present arrangement, the driving shaft 19 is provided with a pinion 23 meshing with a gear 24 mounted on a countershaft 25 journaled above the driving shaft. Rigidly secured to the shaft 25 is a pinion 26 meshing with an idle gear 27 carried by a stud mounted on the frame member beyond the end of the driving shaft. This idle gear 27 meshes with a second idle gear 29, which, in turn, meshes with the gear of the nearest forming roller of the lower group. The gears of the several forming rollers are connected one to the other by idle gears 30, and, in this manner, the several forming rollers are positively driven at a uniform rate of speed from the driving shaft. The upper group of forming rollers are driven through a train of gearing comprising an idle gear 31 meshing with the pinion 26 on the shaft 25 and also with a second idle gear 32 meshing with the gears of the two nearest forming rollers of the upper group. An idle gear 33 connects the second forming roller of this group to the third roller and in this manner the three rollers comprising the group are positively driven at a uniform rate of speed, both the rate of speed and the direction of rotation being the same as that of the rollers of the lower group. The two parts of the mandrel shaft, 5 and 6, are separately driven but are rotated at a uniform rate of speed. To this end each part of the mandrel shaft is connected by a suitable train of gearing with the countershaft 25. These trains of gearing are identical and each comprises a gear 34 rigidly secured to the countershaft and meshing with an idle gear 35 carried by an arm 36 mounted at one end on the countershaft 25 and adjustably connected at its other end to the frame member. The idle gear 35 meshes with a second idle gear 37 which meshes with a gear 38 having connected thereto a gear 38ª which meshes with a gear 39 rigidly secured to the respective portion of the mandrel shaft. Inasmuch as the two parts of the mandrel shaft both have a sliding movement the gears 39 are splined thereto and are so connected to the adjacent bearings, 7ª and 8ª, respectively, as to be held against movement with the shaft when a sliding movement is imparted to the latter. In the present machine a housing 73 is secured to each of the bearings 7ª, and 8ª adjacent to the gear 39. Each housing is substantially U-shaped in cross section and extends over the gear and down on the opposite side thereof. That portion of the housing on the side of the gear opposite the bearing is provided with a slot 74 to enable the housing to extend about the mandrel shaft and to engage the adjacent end of the hub of the gear, thereby holding the gear against movement toward or away from the bearing, but leaving the same free to rotate with the shaft. Preferably, the inner wall of the housing is provided with a rib 75 against which the end of the hub bears. This rib provides a small frictional contact between the housing and the hub and further materially reduces the amount of surface of the housing which it is necessary to dress in order to provide a smooth contact with the hub. This housing also serves as a guard for the gear, and, to this end, is preferably provided with extensions 76 arranged on the opposite sides thereof and extending about a portion of the periphery of the gear. To control the rotation of the mandrel and forming rollers the gear 34 is connected to the shaft 25 by means of suitable clutch mechanism 40 provided with an operating handle or lever 41.

The mandrel and forming rollers are geared to rotate at substantially the same speed, but it has been found in practice that owing to the varying thicknesses of the stock, and other causes, sufficient resistance will be offered to the rotation of the mandrel to cause it to slow down or sometimes stop altogether, thus stripping the teeth from the gears or causing other breakage of the machine. It is desirable that the mandrel should be positively rotated in order that there may be no resistance to the forward movement of the plate of stock when it is first fed into the machine, such as there would be if the mandrel were stationary when the stock first came in contact therewith. In order that the mandrel may be positively driven and yet provision made for variations in the speed thereof, I have interposed a yieldable connection between the mandrel and the driving shaft. This connection, in the present instance, is applied directly between the gears 38 and 38ª of the train of gearing which connects the mandrel shaft with the countershaft. In the form of device here shown the gear 38 is rigidly secured to a bushing 77 which is rotatably mounted upon a stud shaft 78 carried by the arm 36 and which extends some distance beyond the gear 38 and forms a support for the gear 38ª which is rotatably mounted thereon. A friction disk, such as a fibrous washer 79 is interposed between the hubs of the two gears and other frictional material is applied to the outer end of the hub of the gear 38ª. In the present instance the outer friction material consists of one or more rings 80, of fiber or the like, confined between a metal ring 81 and the hub of the gear 38ª. Both the fiber and metal rings are arranged between the hub of the gear and a flange 82 on a ring 83 which is rigidly secured to the end of the bushing by means of screws 84. Other screws 85 extend through the flange 82 and engage the metal ring 81 and press the same tightly against the fibrous rings or washers, thereby frictionally connecting the gear 38ª with the bushing, and, consequently, with the gear 38. The amount of friction is adjusted by means of the screws 85 until it is sufficient to rotate the mandrel when the same is running idly and to operate the same under normal conditions, but to yield if any unusual resistance is offered to the rotation of the mandrel.

To permit the completed sleeve to be removed from the apparatus the movable group of rollers are swung upward, away from the lower group and away from the mandrel, and the two parts of the mandrel are separated, allowing the sleeve to remain upon the lower group of forming rollers from which it can be readily removed in any suitable manner, as by means of tongs. The movements may be imparted to the movable group of forming rollers and to the two parts of the mandrel in any suitable manner. In the present instance the movable support for the upper group of rollers is rigidly secured to and preferably formed integral with a pivoted frame member or lever 42. This frame member is here shown as pivotally mounted on the axis of the countershaft 25 and as extending some distance in the rear of that shaft. In the present machine this frame member has a bearing mounted upon a tubular bushing 86 rigidly supported on the frame of the machine and forming a bearing for the countershaft 25. The rear end of the pivoted frame or lever is of greater weight than that end carrying the rollers, and, when free, will move downward by gravity, thus moving the rollers away from the mandrel. This movement of the frame is controlled by a segmental cam 44 mounted on a shaft 45 journaled in the supporting members 46. The adjacent end of the swinging frame or lever 42 is provided with a roller 68 which is engaged by the cam 44 and serves to reduce the friction between these parts. This roller is preferably carried by a movable block 69 pivotally connected to the end of the lever 42. A suitable resilient member, such as a block of soft rubber, is inserted between the block 69 carrying the roller and the upper part of the lever 42, thereby forming a cushion which will absorb the shock incident to the contact between the cam and the roller. The shaft 45 has rigidly secured thereto a gear 47 which is connected by a train of gearing 48 with a pinion 51 on a shaft 50 on which is mounted a gear 49, which, in turn, meshes with the pinion 23ª on the driving shaft 19.

The sliding movement is positively imparted to the two parts of the mandrel shaft by means of cams 52 and 53 mounted on a shaft 54 journaled in bearings carried by the frame members and arranged below the mandrel shaft. This shaft has rigidly secured thereto a gear 55 which is connected by a train of gearing 56 with the pinion 51 on the shaft 50. These cams are connected with the two parts of the mandrel shaft by means of pivoted arms 57 and 58 each of which is provided at its lower end with a projection having a roller 59 adapted to enter the groove in the cam. The upper end of each arm is bifurcated and extends on the opposite sides of the shaft. A bifurcated block 60 also extends on the opposite sides of this shaft and the two arms thereof are connected with the respective parts of the bifurcated ends of the swinging arms. This block carries two forwardly projecting arms forming a yoke 61 provided with bearings to receive trunnions 62 carried by a collar or thrust plate 63 loosely mounted on the shaft and confined between two collars 64 rigidly secured to the shaft on opposite sides of the collar 63. Preferably a roller bearing is arranged between the thrust plate and one of the fixed collars, and, as here shown, this device comprises two narrow collars 63ª having ball races in their adjacent faces adapted to receive a plurality of balls which are confined between the collars. Thus, the shaft is permitted to rotate freely in the collar 63, but any longitudinal movement imparted to that collar through the arms 57—58 is imparted to the shaft. It will be understood, therefore, that when the shaft 54 is rotated the two parts of the mandrel will be separated and moved outwardly, the two housings 9 and 10 being provided with central openings to permit the outward movement of the two parts of the mandrel, and that the further rotation of the shaft and cams will move the two parts of the mandrel inward to their closed positions. To control the movements of the cams 44, 52 and 53 the gear 49 is loosely mounted on the shaft 50 and is connected thereto by clutch mechanism 65 controlled by means of a lever 66 and a handle 67 extending into a position adjacent to the handle 41 so that the operator can control the clutch mechanism 65 and the clutch mechanism 40 without changing his position.

The action of the mandrel and the rollers upon the stock from which the sleeve is formed tends to spread the stock laterally, this being due in part to the working into the sleeve of the surplus metal in the overlapping edges where the weld is formed. In the machine above described this lateral expansion of the metal is provided for by using stock of a width slightly less than the length of the finished sleeve. This is not always satisfactory, however, owing to the variations in the thickness of the stock and to the fact that the plates from which the sleeves are formed are not always cut into exactly equal lengths. It is desirable, therefore, that the plate of stock should be of a width substantially equal to the length of the finished sleeve and that means should be provided for taking care of the surplus metal which the rollers will force out beyond the edges of the flanges. I have, therefore, in the modified form of the machine shown in Figs. 10, 11, 12, 13 and 14 provided a cutter for removing this surplus metal. To this end the flanges of the mandrel, instead of being shaped as shown in Fig. 5, are provided with an annular recess 87 formed in the flange adjacent the point at which the finished sleeve terminates. In the operation of the machine the "fin" will be projected beyond the edge of the inclined portion of the flange and into this annular recess or cut away portion of the flange of the mandrel. The "fin" will naturally tend to extend in the same line with the flange of the sleeve, and, in order to turn the "fin" down into a position to be acted upon by a cutter, I provide the reduced end portions of one of the forming rollers with extensions adapted to engage the fins at the opposite ends of the sleeve and bend the same into position in substantial alinement with the axis of rotation of the mandrel. Suitable cutters are arranged adjacent to the annular recesses in the flanges of the mandrel to remove these fins. These cutters are preferably rotary cutters, and, in the form here shown, comprise disks 88 of a thickness substantially equal to the width of the recess 87 and having a beveled edge adapted to engage the fin along the edge of the recess and sever the same. These disks are mounted on hubs 89 which have secured thereto flanges 90 adapted to extend inward beyond the edge of the flange of the mandrel on the outer side thereof. The arrangement of the disk 88 and flange 90 of each cutter is such as to form between them an annular groove into which extends the outer portion of the adjacent flange of the mandrel, thereby constituting a guide to maintain the cutter at all times in proper relation to the flange of the mandrel.

Figures 11, 12:
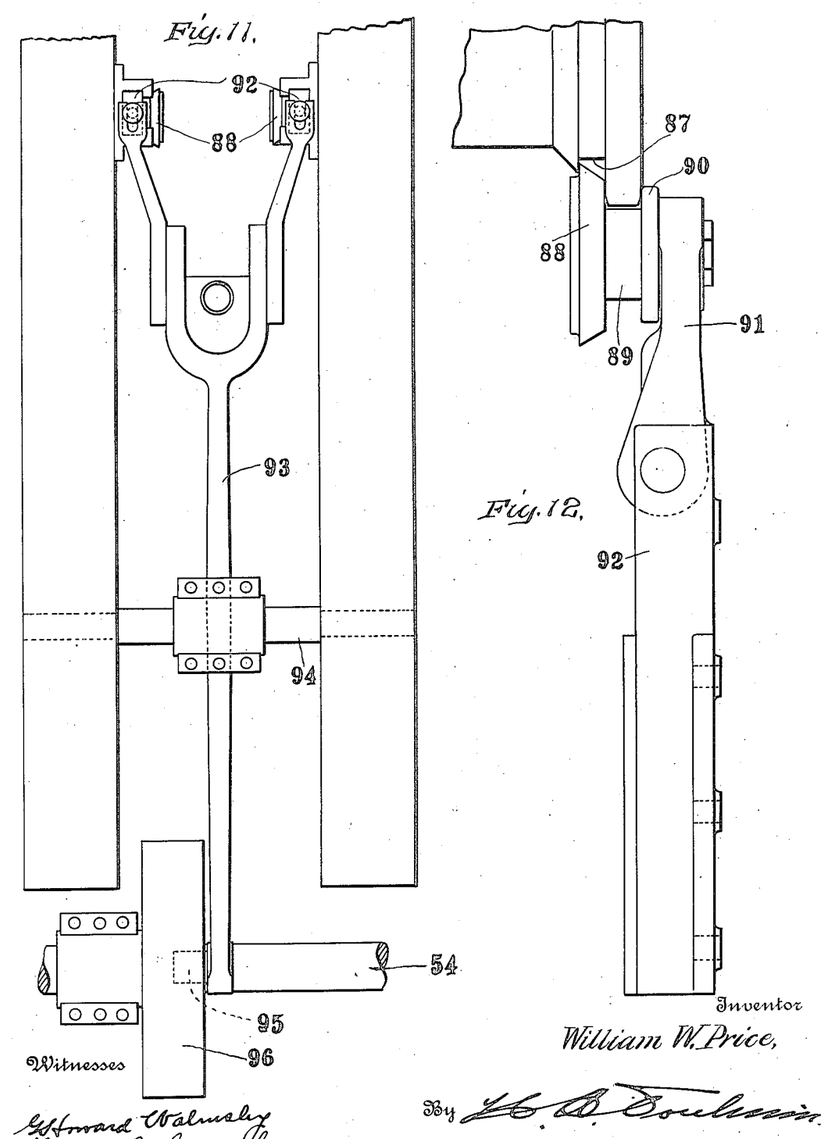
Fig. 11 is a detail view of the operating lever for the cutters.
Fig. 12 is a detail view of one of the cutters and its supporting device.

Under heavy strain the two parts of the mandrel will spread slightly, not enough to have any material effect upon the work but enough to cause the edge of the cutter to engage the mandrel. To avoid this the cutter is movably mounted and its engagement with the flange of the mandrel will cause it to move therewith. Each cutter is preferably mounted on an arm 91 which is pivotally mounted upon a slide block 92 mounted in suitable guides carried by the adjacent housings 9 and 10, respectively. The outer ends of the slide blocks are connected to the respective arms of a bifurcated lever 93 pivotally mounted on a shaft 94 extending between the two housings and provided at its lower end with a projection 95 adapted to enter the groove of a cam 96 rigidly secured to the shaft 54 carrying the cams 52 and 53. The arrangement of the cam 96 with relation to the cams 52 and 53 is such that the lever will be rocked and the cutters moved into inoperative position before the outward movements of the two parts of the mandrel begin. Further, the shape of the cam is such that the cutter will be held firmly in engagement with the work during the time that the sleeve is being formed. The cutter herein shown and described is so shown and described for the purpose of illustration and it will be obvious that cutters of other types may be employed and that these cutters or the present cutter may be mounted and controlled in diffrent manners.

In the operation of the device the plates which are being operated upon are, of course, heated to a welding heat and there is a strang tendency to overheat the mandrel and the forming rollers. To counteract this tendency it is customary to play a stream of water upon the mandrel and upon the work. This, in turn, produces steam which accumulates in the recess or space formed beneath the sleeve at the point where the ends overlap in the early part of the operation of forming the sleeve. This steam is confined beneath the sleeve and between the flanges on the ends of the mandrel and as the action of the rollers and the mandrel tends to flatten out the sleeve and reduce this space, the steam is compressed until finally it must escape at some point, and, in so escaping, it very frequently blows out one side of the sleeve so as to distort and sometimes ruin the sleeve. To overcome this action of the steam I have provided a circumferential series of openings 98 extending through the mandrel. These openings are preferably arranged about the mandrel near the line of juncture of the flanges with the body portion of the mandrel and thus permit any steam which accumulates between the sleeve and the mandrel to escape through the wall of the mandrel. By forming the openings at the juncture of the flanges with the body portion of the mandrel there is little or no tendency on the part of the metal to enter the openings inasmuch as it requires a very strong pressure to force the metal into the angle, and, in practice, it is not customary to apply sufficient pressure to the metal to form a sharp corner on the same. The action of the cutter in removing the fin will leave a rough, ragged edge on the end of the sleeve which would be obviously objectionable. To overcome this the cutter is provided with a shoulder 99 which extends across the edge of the flange on the mandrel, and, consequently, across the severed edge of the sleeve. At the point of juncture with the shoulder the cutter is rounded so as to form a curved surface which comes in contact with the edge of the flange on the sleeve from which the fin has been severed and rounds off this edge, thereby giving the sleeve a smooth, finished appearance.

For the purpose of illustrating the invention I have shown and described one form of apparatus which is designed to construct a particular type of flanged sleeve. It will be understood, however, that the construction of this apparatus may be altered and that the character of the sleeve formed thereby may be changed without departing from the spirit of my invention and I wish it to be understood that I do not desire to be limited to the details of construction shown and described except as required by the scope of the appended claims, for obvious modifications will occur to one skilled in the art.

Having thus fully described my invention, what I claim as new and desire to secure by Letters Patent, is:—

1. In a machine of the character described, the combination, with a two part mandrel, each part comprising a cylindrical portion and a flange and the two parts thereof being capable of relative movement along the axis of said mandrel, and means for positively rotating said mandrel, of a series of positively driven forming rollers arranged about the periphery of said mandrel, each roller having a part extending between the flanges of said mandrel and shaped to coöperate therewith to form and weld a flanged sleeve, a part of said rollers being capable of movement transversely to the axis of said mandrel, whereby the two parts of said mandrel may be withdrawn from the finished sleeve and the forming rollers spaced apart to permit said sleeve to be removed, means to control the operation of said machine as a whole, and other means for interrupting the rotation of said mandrel and said rollers while said sleeve is being removed.

2. In a machine of the character described, the combination, with a two part mandrel, each part comprising a cylindrical portion and a flange and the two parts thereof being capable of relative movement along the axis of said mandrel, and means for positively rotating said mandrel, of a series of positively driven forming rollers arranged about the periphery of said mandrel, each roller having a part extending between the flanges of said mandrel and shaped to coöperate therewith to form and weld a flanged sleeve, a part of said rollers being capable of movement transversely to the axis of said mandrel, whereby the two parts of said mandrel may be withdrawn from the finished sleeve and the forming rollers spaced apart to permit said sleeve to be removed, means to control the operation of said machine as a whole, and means to interrupt the rotation of said forming rollers during the removal of said sleeve.

3. In a machine of the character described, the combination, with a two part mandrel, each part comprising a cylindrical portion and a flange, and the two parts thereof being capable of relative movement along the axis of said mandrel, of a series of forming rollers arranged about the periphery of said mandrel, each roller having a portion extending between the flanges of said mandrel and shaped to coöperate therewith to form and weld a flanged sleeve, the uppermost rollers being capable of substantially radial movement relatively to the axis of said mandrel, whereby the two parts of said mandrel may be withdrawn from the finished sleeve, the sleeve allowed to rest on the lower forming rollers and the upper forming rollers moved away from the lower forming rollers to permit the sleeve to be removed.

4. In a machine of the character described, the combination, with a two part mandrel, each part comprising a cylindrical portion and a flange and the two parts thereof being capable of relative movement along the axis of said mandrel, of a series of forming rollers arranged about the periphery of said mandrel, each roller having a portion extending between the flanges of said mandrel and shaped to coöperate therewith to form and weld a flanged sleeve, the uppermost rollers being capable of substantially radial movement relatively to the axis of said mandrel, whereby the two parts of said mandrel may be withdrawn from the finished sleeve, the sleeve allowed to rest on the lower forming rollers and the upper forming rollers moved away from the lower forming rollers to permit the sleeve to be removed, and means to interrupt the rotation of said lower forming rollers after the completion of the sleeve and during its removal.

5. In a machine of the character described, a flanged mandrel, means for positively rotating the same, a forming roller coöperating with said mandrel and comprising a body portion extending between the flanges thereof, reduced portions on the opposite sides of said body portion, and collars loosely mounted on said reduced portions and engaging the respective flanges of said mandrel.

6. In a machine of the character described, a mandrel having a substantially cylindrical portion and outwardly flared portions at the ends of said cylindrical portion, a forming roller coöperating with said mandrel to form a flanged sleeve, said roller having a substantially cylindrical portion, and outwardly flared portions at the ends of said cylindrical portion to coöperate with the cylindrical portions and flared portions, respectively, of said mandrel, said forming roller also having other cylindrical portions beyond the outwardly flared portions, said last-mentioned cylindrical portions being arranged to engage the edges of the respective flanges of said sleeve, said mandrel having openings formed therein at points adjacent the lines of juncture of said cylindrical portions and said outwardly flared portions.

7. In a machine of the character described, a mandrel having flanges and forming rollers having parts adapted to extend between the flanges of said mandrel and coöperating therewith to form a flanged sleeve, said mandrel having openings formed in the periphery thereof between said flanges.

8. In a machine of the character described, the combination, with a mandrel, and a series of forming devices arranged about said mandrel, of means for positively rotating said mandrel, means to control the operation of the machine as a whole, and other means for interrupting the rotation of said mandrel during the removal of the device formed on the same.

9. In a machine of the character described, the combination, with a mandrel having flanges, and a series of forming rollers arranged about the same and coöperating therewith to form a sleeve, of means to manipulate said parts to permit said sleeve to be removed, means to control the operation of the machine as a whole, and other means to interrupt the rotation of said mandrel and said rollers during the removal of said sleeve.

10. In a machine of the character described, the combination, with a two part mandrel, each part thereof having an annular flange and each part being movable toward and away from the other part, and a series of forming rollers arranged about said mandrel, a part of said rollers being movable relatively to the mandrel and to the other rollers, of means for positively rotating the two parts of said mandrel and said rollers, means to control the operation of the machine as a whole, and other means to interrupt the rotation of the parts of said mandrel and said rollers when said parts have been moved away from each other to permit the removal of the sleeve.

11. In a machine of the character described, the combination, with a mandrel, and a series of forming rollers coöperating therewith to form a sleeve, of a source of power, means for driving said mandrel and said rollers from said source of power, and a yieldable connection interposed between said mandrel and said source of power.

12. In a machine of the character described, the combination, with a two part mandrel, a two part shaft having its parts connected with the respective parts of said mandrel, means for sliding the two parts of said shaft to move the two parts of said mandrel toward and away from each other, and a plurality of forming rollers arranged about said mandrel, of a driving shaft, operative connections between said driving shaft and the two parts of said mandrel shaft, friction devices interposed in said operative connections, and means for driving said forming rollers from said driving shaft.

13. In a machine of the character described, the combination, with a two part mandrel and a slidable shaft connected to one part of said mandrel and adapted to have both a rotary and a reciprocatory movement, and a bearing for said shaft, of a gear mounted on said shaft and connected thereto in a manner to permit said shaft to have a sliding movement, relatively thereto but to cause the shaft to rotate with the gear, and a housing secured to said bearing and having a part engaging said gear on the side thereof opposite said bearing to hold said gear against movement with said shaft when sliding movement is imparted to the latter.

14. In a machine of the character described, the combination, with a two part mandrel and a slidable shaft connected to one part of said mandrel and adapted to have both a rotary and reciprocatory movement, and a bearing for said shaft, of a gear mounted on said shaft and connected thereto in a manner to permit said shaft to have a sliding movement relatively thereto but to cause the shaft to rotate with the gear, and a housing secured to said shaft, extending about said gear and having a part adapted to engage the hub thereof, said housing serving both as a guard for said gear and to hold the same against movement toward or away from said bearing.

15. In a machine of the character described, the combination, with a mandrel having a flange at one end thereof, said flange having an annular recess dividing the same into two parts, and means coöperating with said mandrel to form a flanged sleeve thereon, of a rotary cutter supported adjacent to said mandrel and comprising a blade portion adapted to enter said recess to trim the end of said flanged sleeve and having an annular recess adapted to receive the outer portion of the flange of said mandrel to retain said cutter in proper position relatively to the work.

16. In a machine of the character described, the combination, with a two part mandrel, each part of said mandrel having a flange and the two parts of said mandrel being movable relatively one to the other, and forming rollers arranged about said mandrel and coöperating therewith to form a flanged sleeve, of cutters supported near the flanges of said mandrel, adapted to trim the edges of said flanged sleeve, and means for moving said cutters away from said mandrel to permit the two parts thereof to be separated.

17. In a machine of the character described, the combination, with a two part mandrel, each part thereof having a flange, rollers coöperating with said mandrel to form a flanged sleeve, and means for moving the two parts of said mandrel toward and away from each other, of a cutter movably mounted adjacent to the flange of each part of said mandrel, and means for moving said cutters away from said mandrel before the operation of said means for moving the two parts of said mandrel.

18. In a machine of the character described, the combination, with a two part mandrel, a two part shaft carrying the respective parts of said mandrel, the two parts of said shaft being slidable to permit the two parts of said mandrel to be moved toward and away from each other, and forming rollers arranged about said mandrel and coöperating therewith to form a sleeve, of cam operated devices to impart sliding movement to the two parts of said shaft, cutters arranged near said mandrel to trim the ends of said sleeve, and a cam-operated device for moving said cutters toward and away from said mandrel, said last-mentioned cam-operated device being timed to move said cutters away from said mandrel before the first-mentioned cam-operating devices impart a sliding movement to said shaft.

19. In a machine of the character described, the combination, with a two part mandrel, a two part shaft carrying the respective parts of said mandrel, the two parts of said shaft being slidable to permit the two parts of said mandrel to be moved toward and away from each other, and forming rollers arranged about said mandrel and coöperating therewith to form a' sleeve, of a shaft, cams mounted on said shaft and operatively connected to the two parts of said mandrel shaft to impart sliding movement thereto, cutters supported near said mandrel to trim the ends of said sleeve, a lever carrying said cutters, and a cam mounted on said cam shaft to actuate said lever.

In testimony whereof, I affix my signature in presence of two witnesses.

WILLIAM W. PRICE.

Witnesses:
EDWARD L. REED,
G. HOWARD WALMSLEY.